United States Patent [19]
Pabst et al.

[11] Patent Number: 6,164,130
[45] Date of Patent: Dec. 26, 2000

[54] ELECTROMAGNETIC MEASURING SYSTEM FOR METEOROLOGY

[75] Inventors: Michael Pabst, Staffelstein-Neubanz; Michael Geisler, Apolda; Gregor Bugla, Bamberg, all of Germany

[73] Assignee: Spherics Mess- und Analysetechnik GmbH, Lichtenfels, Germany

[21] Appl. No.: 09/461,862

[22] Filed: Dec. 15, 1999

Related U.S. Application Data

[63] Continuation of application No. PCT/EP98/03563, Jun. 12, 1998.

[30] Foreign Application Priority Data

Jun. 15, 1997 [DE] Germany .......................... 197 25 212

[51] Int. Cl.$^7$ .................................................. G01W 1/00
[52] U.S. Cl. ........................................................ 73/170.24
[58] Field of Search .......................... 73/170.16, 170.17, 73/170.24, 170.27, 178 R, 170 R; 702/3; 324/72, 77 E, 77 R, 335; 340/601; 342/26

[56] References Cited

U.S. PATENT DOCUMENTS

| | | | |
|---|---|---|---|
| 3,738,164 | 6/1973 | Sanford | 73/170.16 |
| 4,631,957 | 12/1986 | Ruhenstroth-Bauer | 73/170 R |
| 4,672,305 | 6/1987 | Coleman | 324/72 |
| 4,901,564 | 2/1990 | Williams | 73/170 R |
| 6,061,013 | 5/2000 | Sauvageot et al. | 342/26 |
| 6,067,852 | 5/2000 | Alber et al. | 73/178 R |

FOREIGN PATENT DOCUMENTS

| | | |
|---|---|---|
| 0 128 572 A2 | 12/1984 | European Pat. Off. |
| 195 14 465A1 | 11/1995 | Germany |
| WO 97/05508 | 2/1997 | WIPO |

*Primary Examiner*—William Oen
*Attorney, Agent, or Firm*—Herbert L. Lerner; Laurence A. Greenberg; Werner H. Stemer

[57] ABSTRACT

A meteorological electromagnetic measuring system contains a plurality of measuring stations which are physically distributed in a given area. Each measuring station contains at least one spherics receiver to pick up spherics signals and a transmission device to transfer measuring data available in the measuring station and derived from the spherics signals to a central evaluation unit assigned to the measuring stations. The measuring stations are disposed such that an average distance between adjacent measuring stations is less than 50 km for area wide detection of short-range spherics signals.

27 Claims, 2 Drawing Sheets

ELECTROMAGNETIC MEASURING SYSTEM FOR METEOROLOGY

CROSS-REFERENCE TO RELATED APPLICATION

This is a continuation of copending International Application PCT/EP98/03563, filed Jun. 12, 1998, which designated the United States.

BACKGROUND OF THE INVENTION

Field of the Invention

The invention relates to an electromagnetic measuring system for meteorology, with the aid of which spherics signals are detected and analyzed.

Spherics signals are electromagnetic signals in the form of irregularly shaped radiation pulses that occur in dynamic processes in the atmosphere, for example in the approach regions of thunderstorm or weather fronts, or in convective cloud formations.

It is known from numerous observations that the individual parameters of the spherics signals, such as number, amplitude and frequency of the oscillations, and the pulse repetition frequency, the frequency distribution over the frequency values and the signal shapes are closely linked with the weather processes causing them, in particular with the type and movement of atmospheric air masses.

The previously known electromagnetic measuring systems for detecting and analyzing spherics signals are individual receivers or sensors with the aid of which, depending on the system, only a rough conclusion can be drawn concerning the general weather activity. This is due to the fact that when receiving a spherics signal it is possible to assess at most the direction of the source location, but not the signal strength at the source location nor the variation produced by the different physical states of the atmosphere along the propagation path of the spherics signal.

SUMMARY OF THE INVENTION

It is accordingly an object of the invention to provide an electromagnetic measuring system for meteorology that overcomes the above-mentioned disadvantages of the prior art devices of this general type, with which general weather activity can be more precisely detected as a basis for a weather forecast.

With the foregoing and other objects in view there is provided, in accordance with the invention, an electromagnetic measuring system for meteorology, including:
  a plurality of measuring stations disposed distributed spatially in a prescribed region of space, each of the measuring stations having at least one spherics receiver for receiving spherics signals and a transmitter for transmitting measured data derived from the spherics signals received in the measuring stations, a mean spacing of respectively neighboring measuring stations being less than 50 km to provide area-covering detection of short-range spherics signals; and
  a central evaluation unit associated with the measuring stations and receiving the measured data.

The electromagnetic measuring system according to the invention contains a plurality of measuring stations that are disposed distributed spatially in a prescribed region of space. Each measuring station includes at least one spherics receiver for receiving the spherics signals and a transmitter for transmitting measured data, respectively present in the measuring station and derived from the spherics signals, to a central evaluation unit assigned to the measuring stations. The mean spacing of respectively neighboring measuring stations is less than 50 km for the purpose of area-covering detection of short-range spherics signals.

The invention is based on the consideration that the atmospheric events relevant for short-range forecasts (nowcasts) generally lead to spherics signals of only a small range. The spherics signals have a pulse duration of up to a few 100 $\mu$s, and contain one or more oscillations whose oscillation frequency resides in the region between approximately 3 and 100 kHz, that is to say in the VLF region. The pulse repetition frequency of the spherics signals can be up to a few 100 Hz. The maximum amplitude of the spherics signals depends on the type and the distance of the signal source, and is up to a few volts per meter for the electric field vector. The typical discharge current strengths are less than 1 kA, with the result that the effective range is at most 50 km. The spherics sources particularly relevant for the short-range forecast can thus be measured only in the near region, that is to say at distances which correspond to the order of magnitude of the wavelength, with the result that direction finding cannot be carried out for them, for physical reasons. Spherics signals therefore differ clearly from electromagnetic signals which are produced by lightning, since the discharge currents in lightning are two orders of magnitude higher and therefore have a greater range and, for example, permit direction finding to be performed. Consequently, the provision of an appropriately fine-meshed measuring network according to the invention also renders it possible to detect the spherics signals of small range in an area-covering fashion and to use them for a reliable weather forecast which is of high resolution in time and space.

The invention also proceeds from the consideration that it is possible by use of a plurality of measuring stations which are disposed distributed spatially in a prescribed region of space in the form of a measuring station network to perform an analysis of the variation experienced by a spherics signal in the atmosphere along its propagation through the latter which permits a better conclusion concerning the general weather activity. In particular, in addition to the current weather phenomena it is also possible to detect their causes, for example air movements and discharging processes, by a fine-meshed and continuously performed measurement of spherics signals, with the result that a hit rate which is high, in particular, for short-range forecasts (typically 15 minutes to 2 hours) is possible with regard to the future weather development. The basic idea of the invention is thus to set up an electromagnetic measuring system for meteorology whose transmitters are represented by stochastically occurring natural events within the atmosphere, and whose receivers are formed by a network of measuring stations.

Furthermore, the invention is based on the consideration that along their propagation path in the atmosphere, the spherics signals are influenced by locally different thermodynamic and electric conditions, and that it is possible in this way to derive supplementary conclusions concerning the current weather activity and the consequences arising therefrom for a forecast.

The data provided by the measuring system according to the invention therefore provide an area-covering image of the weak atmospheric VLF emissions. These data can be used not only as a basis for a reliable short-range weather forecast, but also, in addition, as a reliable basis for the epidemiological investigation of the biotropic effects of VLF pulses on human organism.

The mean spacing of neighboring measuring stations, that is to say the mesh width of the measuring network grid is preferably between 10 km and 50 km, in particular approximately 30 km. This permits an area-covering detection of the spherics activities with a resolution of approximately 10 km.

In a preferred refinement of the invention, each measuring station is provided with a processing unit for deriving measured data from the received spherics signals. The processing unit can in this case contain simple filters and/or analog signal processing stages with the aid of which the signals are processed in analog fashion, with the result that measured data are present in analog form.

In particular, the processing unit contains a digital signal processor upstream of which an analog-to-digital converter is connected. In this case, the spherics signals can be subjected to a digital signal analysis, for example an additional digital filtering, in particular a spectral analysis or a time-series analysis of successive spherics signals. The measured data derived by the signal processor from such an analysis are then transmitted as a digital data word to the central evaluation unit.

The digital signal analysis is preferably undertaken with the aid of suitable software, in particular software stored in an EPROM and teleserviced by the central evaluation unit. In a further advantageous refinement of the invention, an appraising analysis of the spherics signals takes place in the digital signal processor in which the spherics signals are respectively assigned to an activity class with the aid of prescribed appraising criteria. It is possible through the use of such intelligent measuring stations substantially to reduce the volume of measured data to be transmitted and to facilitate their subsequent processing which can, for example, contain a rapid comparison of the pattern of the data image of the weather activity currently transmitted from all measuring stations to the central evaluation unit with already stored data images of earlier weather activities, in order to be able to derive forecasts from this comparison.

In particular, a separation of spherics signals from technical noise signals is performed in the digital signal processor.

A signal conditioning stage with an analog filter is preferably connected downstream of the spherics receiver, which includes at least one magnetic VLF antenna. It is possible by use of this measure for noise signals not based on atmospheric causes, so-called technics signals, to be eliminated, at least partially, even before a digital signal analysis, since only electromagnetic signals in the frequency bands relevant to spherics signals are fed for further processing and analysis, with the result that the volume of data to be analyzed digitally is reduced.

It is advantageous to provide in the central evaluation unit means for determining the location of a spherics source by evaluating the measured data of a plurality of neighboring measuring stations, for example with the aid of cluster algorithms. This permits a precise determination of the location even in the near-field region, since the errors which occur unavoidably in the near-field region in the case of direction finding and propagation time methods as are used, for example, in lightning direction finding, are avoided.

In a particularly preferred refinement of the invention, a central direction-finding transmitter is provided for determining the alignment of at least a portion of the spherics receiver.

In a preferred embodiment, the spherics receiver includes two magnetic VLF antennas aligned horizontally and orthogonally relative to one another. It is thereby possible for vertically polarized spherics signals to be received from arbitrary directions. Moreover, it is possible by comparing the signals received in the mutually orthogonal horizontal magnetic antennas to analyze the direction of propagation of vertically polarized spherics signals of longer range or spherics signals with a vertically polarized component, that is to say spherics signals or spherics signal components whose electric field vector is orientated perpendicular to, and whose magnetic field vector is oriented in parallel to the surface of the earth.

In a further preferred embodiment, the spherics receiver contains a vertically aligned magnetic VLF antenna, at least in a portion of the measuring stations. It is thereby also possible to detect spherics events that take place directly over the relevant spherics receiver.

In a further advantageous embodiment, the spherics receiver includes, in at least a portion of the measuring stations, a dipole antenna for measuring a component, preferably the vertical component of the electric field. Further information can be derived from the measurement of such a field component. In particular, the relationships between the electric field strength and the magnetic field strength, in particular their mutual distance-dependent phase shift, can be analyzed.

In particular, in at least a portion of the measuring stations a broadband VLF receiver with a broadcast antenna can be provided for receiving longwave broadcast signals. It is thereby possible also to use broadcast transmitters in addition to the atmospheric transmitters for the purpose of analyzing the state of the atmosphere. The broadcast signals received by the measuring stations equipped with broadband broadcast antennas can then be intercompared in the central evaluation unit. It is then possible to draw conclusions from the comparison concerning the atmospheric conditions along the propagation path of the broadcast signal.

In a further advantageous embodiment, the measuring station contains at least one further sensor for detecting a further local measurand. Such a local measurand can be, for example, the pressure, the temperature, the conductivity, the humidity, the insolation or the occurrence of precipitation.

In a preferred refinement, at least a portion of the measuring stations contains a measuring system for detecting their current spatial position. The measuring system can be, for example, a GPS measuring system. It is thereby also possible to include measuring stations whose location is not exactly fixed, for example measuring stations based at sea or measuring stations in weather balloons.

In a preferred refinement of the invention, the transmitter is controlled by events, that is to say transmission takes place only when the measuring station records an event, that is to say a spherics signal. Consequently, the number of the measured data transmitted to the evaluation unit, and thus also the computation outlay required in the processing unit, can be reduced.

In particular, the transmitter can be activated in a time-controlled fashion, thus rendering possible a temporally continuous image of the atmospheric processes in the entire region of space covered by the measuring stations.

In addition, a portion of the measuring stations can be equipped with an VHF/UHF receiver in order to measure atmospheric influences in the HF region.

In a particularly preferred refinement of the invention, at least a portion of the measuring stations includes an array of respectively similar spherics receivers which are disposed at prescribed spacings from one another, in particular between 1 and 20 m. By use of these measures, short-range technical noise signals can easily be separated from longer-range genuine spherics signals by providing for further processing only those signals which occur coincidentally in all spherics receivers.

Other features which are considered as characteristic for the invention are set forth in the appended claims.

Although the invention is illustrated and described herein as embodied in an electromagnetic measuring system for meteorology, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
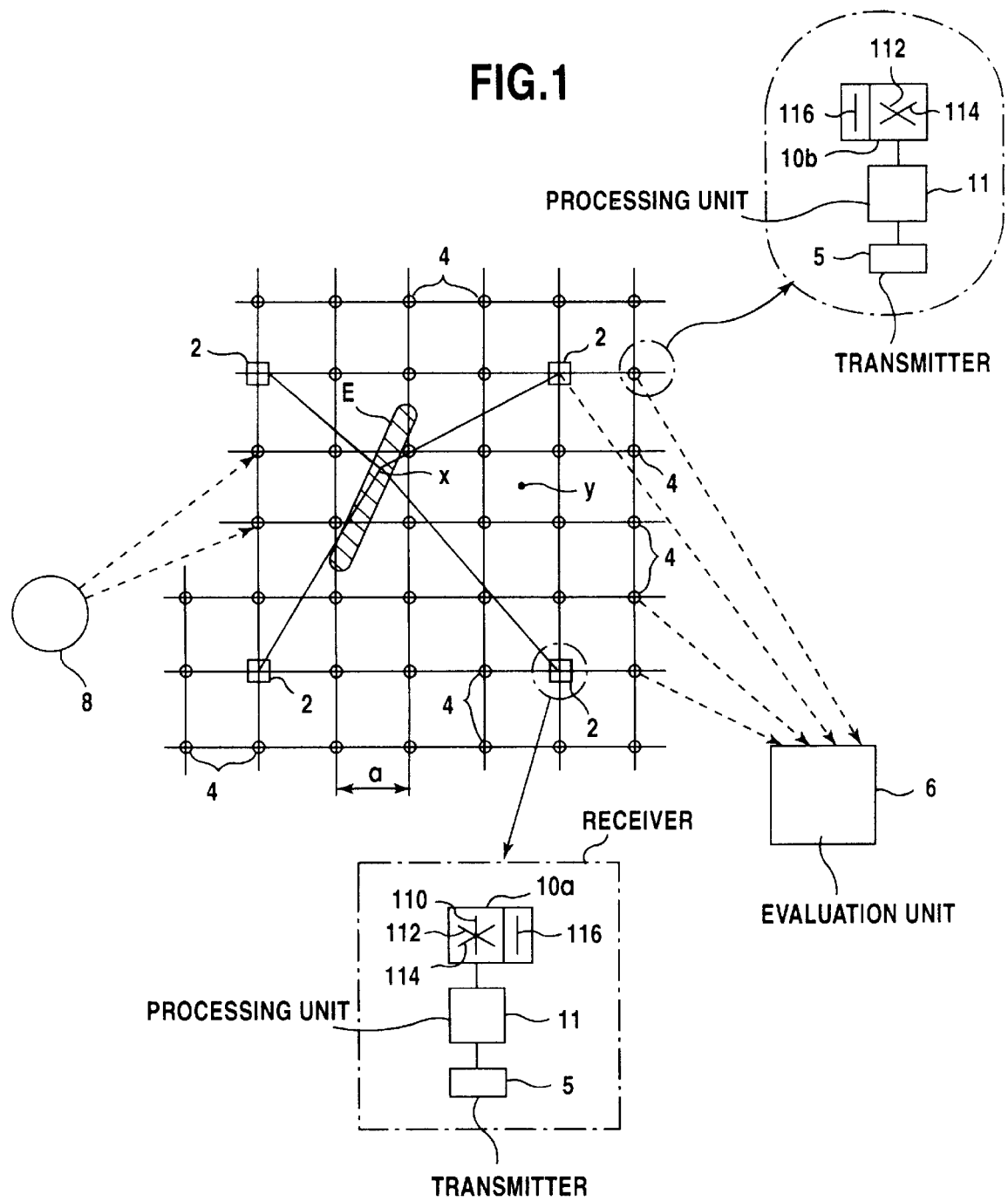
FIG. 1 is an illustration of a basic representation of an electromagnetic measuring system having a multiplicity of measuring stations distributed in a region of space in accordance with the invention.

In all the figures of the drawing, sub-features and integral parts that correspond to one another bear the same reference symbol in each case. Referring now to the figures of the drawing in detail and first, particularly, to FIG. 1 thereof, there is shown a multiplicity of measuring stations 2, 4 disposed in the fashion of a network in a region of space. In FIG. 1, the measuring stations 2, 4 form a square grid network. However, the measuring stations 2, 4 need not be disposed in such a square grid network. A mean spacing a of the measuring stations 2, 4 from one another, which corresponds to the mesh width of the grid in the square grid represented, is less than 50 km, preferably between 10 km and 50 km, in particular approximately 30 km. This ensures that the short-range spherics signals can be detected by at least a few neighboring measuring stations 2, 4.

Each measuring station 2, 4 includes a transmitter 5 which transmits to a central evaluation unit 6 the measured data recorded in the measuring stations 2, 4 and derived from the spherics signals as well as from further measurands possibly recorded.

A fixed direction-finding transmitter 8, for example the DCF77 time-signal transmitter in Mainfingen, serves to monitor the alignment of receiving antennas located in the measuring stations 2, 4.

The measuring station 2 represented by a square in the drawing differs from the measuring stations 4 represented by a circle to the effect that the first-mentioned measuring stations 2 have a spherics receiver 10a which contains one vertical antenna and two magnetic antennas disposed in a mutually orthogonal and horizontal fashion 110 and 112, 114, respectively, for example ferrite antennas or air-coil antennas. By contrast, the measuring stations 4 have a spherics receiver 10b which contains only two horizontal magnetic VLF antennas 112, 114, with the aid of which it is not possible to measure a vertical magnetic field component. The subnetwork formed from the measuring stations 2 is in this case not so narrowly meshed as the subnetwork formed from the measuring stations 4, since the vertical magnetic field components additionally received by the spherics receiver 10a belong, as a rule, only to spherics events which take place in the atmosphere directly over the relevant measuring station 2 and are therefore already detected by the horizontal magnetic VLF antennas 112, 114 of the neighboring measuring stations.

The spherics receivers 10a, 10b of a portion of the measuring stations 2 and 4, respectively, can be equipped, in addition, with a vertical dipole antenna 116 in order to measure the vertical component of the electric field in addition to the horizontal components of the magnetic field.

Each of the measuring stations 2, 4 is equipped with a processing unit 11 in which the received spherics signals are processed into analog or digital data which are then transmitted to the central evaluation unit 6 via the transmitter 5, for example a telephone modem or a radio transmitter. Such a processing unit 11 can consist in a simple case merely of an analog arithmetic unit, for example a filter.

Instead of a single spherics receiver 10a or 10b, at least a portion of the measuring stations 2, 4 include in each case a linear or matrix-shaped array of similar spherics receivers 10a or 10b, which are disposed at spacings of approximately 1 to 20 m from one another. It is possible by use of this measure for technically generated VLF pulses with ranges of a few meters to be separated in a simple way from genuine spherics signals with ranges of several kilometers.

In an alternative refinement, the processing unit 11 can subject the spherics signals themselves, which have been digitized in a digital signal processor, to further digital signal processing before transmitting them to the central evaluation unit 6.

Illustrated in FIG. 1—in a fashion emphasized by hatching—is an atmospheric event E, for example a developing cold front. In such a cold front, characteristic discharge processes take place which are the cause of spherics signals characteristic of this process. Experience has shown that the presence of such a cold front leads chiefly to relatively longwave vertically polarized spherics signals. Consequently, it is possible with the aid of the measuring stations 2, 4 to determine the location x of the event triggering a vertically polarized spherics signal, the reception of the spherics signal in two measuring stations 2, 4 even being sufficient in principle. The spherics signals received by the measuring stations 2, 4 and analyzed with regard to their place of origin and manifestation now permit the statement that there is a cold front at the location x. The measuring stations 2 located in the vicinity of the event E, in the example the cold front, additionally receive with their vertical VLF antennas 110, in particular, weak horizontally polarized spherics signals whose signal variation, signal frequency and signal duration permit a conclusion as to whether the cold front is developing or advancing. It is therefore possible by use of the distribution of a multiplicity of measuring stations 2, 4 over an area to obtain comprehensive information on the weather activity which can serve as a basis for a reliable short-range weather forecast. Thus, in the case of the use of such a device according to the invention precise forecasts can be made to the effect that the development of a cold front at a location y can be forecast precisely for a period of from half an hour up to several hours.

However, determining the location of the spherics signals by direction finding is possible only for longer-range spherics signals. The determination of the location of the source of short-range spherics signals is therefore performed in the central evaluation unit 6 by using so-called cluster algorithms to evaluate the data on pulse rate and power density received from mutually neighboring measuring stations 2, 4.

Figure 2:
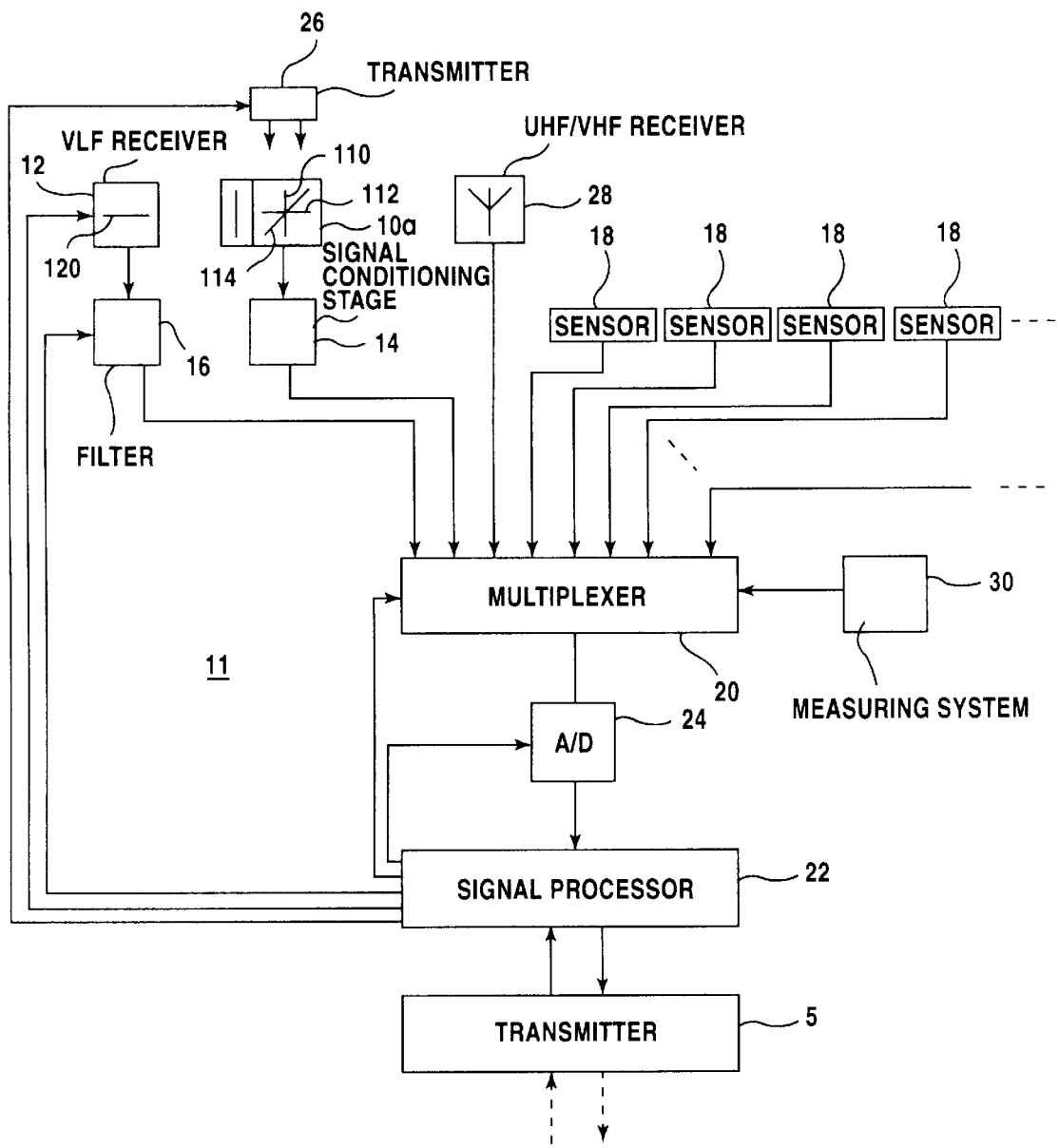
FIG. 2 is a block diagram of a preferred refinement of a measuring station as used in the electromagnetic measuring system.

In accordance with FIG. 2, the measuring station 2 includes at least one spherics receiver 10a equipped with the three magnetic VLF antennas 110, 112, 114 and an additional broadband VLF receiver 12 with a horizontal broadcast antenna 120. It can also be seen in FIG. 2 that the spherics receiver 10a is additionally equipped with a dipole antenna 116.

Assigned to the spherics receiver 10a is a signal conditioning stage 14 which includes, for example, analog filters for the purpose of separating the spherics signals from technical noise signals (technics signals). In an alternative advantageous refinement, a plurality of spherics receivers 10a are disposed in the form of an array in the measuring station 2, as is indicated by points. It is possible by use of this measure to separate spherics signals from technical noise signals in a particularly simple and reliable fashion.

Connected downstream of the VLF receiver 12 is a controllable filter 16 with the aid of which the receiver 12 can be tuned to the respective transmitter. Moreover, the broadcast antenna 20 of the VLF receiver 12 can be remotely controlled via a signal processor 22 by the central evaluation unit 6.

Also provided in the measuring stations 2, 4 are a number of further sensors 18 with the aid of which further local measurands, for example temperature, air pressure, relative humidity, electric conductivity of the atmosphere are detected.

The signal conditioning stage 14, the controllable filter 16 and the sensors 18 are connected with their output to a multiplexer 20 whose address input is driven by the signal processor 22, with the result that in each case only the signal associated with the current address input is present at the output of the multiplexer 20. The measuring signal present at the output of the multiplexer 20 is fed to the signal processor 22 via an analog-to-digital converter 24.

The spherics receiver 10a is assigned a transmitter 26 which, under the control of the signal processor 22, emits prescribed transmitted signals for self-testing the spherics receiver 10a.

The measured data recorded, in particular the spherics signals, are analyzed in the signal processor 22. This analysis can consist in using plausibility checks to separate "fake" spherics signals from "genuine" spherics signals. Given the presence of a plurality of spherics receivers in the measuring station 2, 4, this can be done, for example, by further processing only signals simultaneously received by all spherics receivers.

Furthermore, it is also possible to generate in the digital signal processor 22 an interpreted signal derived from the spherics signals which can be transmitted, via the transmitter 5, to the central evaluation unit 6. The signal can be for example a data word with an information content obtained by interpretation of the spherics signals, for example with the information content of "cold front at location x" or "cold front developing at the location of the measuring station".

The algorithms for digital signal processing are stored in the signal processor 22 in an EPROM, and can be updated freely via a modem present in the transmitter 5. In the case of measuring stations with only one spherics receiver, for example, these algorithms contain an algorithm for digitally separating the spherics signals from technical noise signals (discriminator) which could not be filtered out by the analog filter of the signal conditioning stage 14.

Also stored in the digital signal processor 22 is an algorithm for analyzing the spherics signals (analyzer). The analysis can be performed by virtue of the fact that received signals identified as spherics signals are analyzed in defined spectral intervals, for example in the intervals 1 to 10 kHz, 10 to 20 kHz, 20 to 30 kHz, 30 to 50 kHz, 50 to 100 kHz, 100 to 200 kHz, 200 to 500 kHz, for example in fixed temporal measuring intervals, for example in a measuring interval of one minute duration. For this purpose, the spectral power densities in these spectral regions are integrated over the corresponding time interval, and the number of pulses in this time interval are determined. A fixed number of such measuring intervals (for example 15) is combined to form one transmission interval each, upon the expiry of which the data collected in the process are transmitted to the central evaluation unit 6 for further processing and archiving.

Moreover, the received spherics signals can be processed and analyzed to such an extent in the signal processor 22 that they can be assigned to an activity class in a prescribed classification scheme, and only a transmission of the activity class need be undertaken upon expiry of a transmission interval. In this case, an activity class is to be understood as the combination of the measured values of a measuring interval in accordance with a pattern recognized as typical.

The volume of the data to be transmitted is substantially reduced by this measure.

Also provided in the exemplary embodiment is an UHF/VHF receiver 28 with the aid of which the transmitted television signals of normal television transmitters can be received in the HF region. This permits a supplementary analysis and interpretation of the weather activity with the aid of electromagnetic signals in the HF region.

Moreover, in the case of the measuring station explained in more detail in the exemplary embodiment, provision is made of a measuring system 30 for detecting the current spatial position, for example a GPS receiving system, with the aid of which the current location of the measuring station can be determined. This is advantageous, for example, in the case of non-stationary measuring stations.

We claim:

1. An electromagnetic measuring system for meteorology, comprising:

a plurality of measuring stations disposed distributed spatially in a prescribed region of space, each of said measuring stations having at least one spherics receiver for receiving spherics signals and a transmitter for transmitting measured data derived from the spherics signals received in said measuring stations, a mean spacing of respectively neighboring measuring stations being less than 50 km to provide area-covering detection of short-range spherics signals; and a central evaluation unit associated with said measuring stations and receiving the measured data.

2. The electromagnetic measuring system according to claim 1, wherein said mean spacing is less than 30 km.

3. The electromagnetic measuring system according to claim 1, wherein each of said measuring stations has a processing unit for deriving the measured data from the spherics signals.

4. The electromagnetic measuring system according claim 3, wherein said processing unit has a digital signal processor for digitally processing the spherics signals received and an A/D converter connected upstream of said digital signal processor.

5. The electromagnetic measuring system according to claim 4, wherein said digital signal processor carries out a spectral analysis of the spherics signals.

6. The electromagnetic measuring system according claim 4, wherein said digital signal processor carries out a time-series analysis of successive spherics signals.

7. The electromagnetic measuring system according to claim 5, wherein said digital signal processor appraises the spherics signals that have been analyzed with an aid of prescribed appraisal criteria.

8. The electromagnetic measuring system according to claim 4, wherein said digital signal processor has software for carrying out an analysis of the spherics signals and the software is teleserviced by said central evaluation unit.

9. The electromagnetic measuring system according to claim 1, wherein said digital signal processor separates the spherics signals from technical noise signals.

10. The electromagnetic measuring system according to claim 3, wherein said processing unit has a signal conditioning stage with an analog filter that is connected downstream of said at least one spherics receiver, and said at least one spherics receiver has at least one magnetic VLF antenna.

11. The electromagnetic measuring system according to claim 1, wherein said central evaluation unit has a means for determining a location of a spherics source by evaluating the measured data of at least neighboring measuring stations.

12. The electromagnetic measuring system according to claim 1, including a central direction-finding transmitter for determining an alignment of said at least one spherics receiver of each of said measuring stations.

13. The electromagnetic measuring system according to claim 1, wherein said at least one spherics receiver has two horizontal and mutually perpendicularly aligned magnetic VLF antennas.

14. The electromagnetic measuring system according to claim 13, wherein said at least one spherics receiver includes a vertically aligned magnetic VLF antenna in at least some of said measuring stations.

15. The electromagnetic measuring system according to claim 13, wherein said at least one spherics receiver has a dipole antenna for measuring a component of an electric field in at least some of said measuring stations.

16. The electromagnetic measuring system according to claim 15, wherein said dipole antenna measures a vertical component of the electric field.

17. The electromagnetic measuring system according to claim 1, wherein at least some of said measuring stations have a broadband VLF receiver with a broadcast antenna for receiving longwave broadcast signals.

18. The electromagnetic measuring system according to claim 17, including a central direction finding transmitter for monitoring an alignment of said broadcast antenna.

19. The electromagnetic measuring system according to claim 1, wherein said measuring stations include at least one sensor for detecting a further local measurand.

20. The electromagnetic measuring system according to claim 1, wherein said measuring stations contain a self-testing device for testing said at least one spherics receiver.

21. The electromagnetic measuring system according to claim 1, wherein at least some of said measuring stations have a measuring system for detecting a current spatial position of said measure stations.

22. The electromagnetic measuring system according to claim 1, wherein said transmitter can be activated in an event-controlled fashion.

23. The electromagnetic measuring system according to claim 1, wherein said transmitter can be activated in a time-controlled fashion.

24. The electromagnetic measuring system according to claim 1, wherein some of said measuring stations have a UHF/VHF receiver.

25. The electromagnetic measuring system according to claim 1, wherein said at least one spherics receiver is an array of respectively similar spherics receivers disposed at prescribed spacings from one another in at least some of said measuring stations.

26. The electromagnetic measuring system according to claim 25, wherein said prescribed spacings of said spherics receivers is between 1 and 20 m.

27. The electromagnetic measuring system according to claim 6, wherein said digital signal processor appraises the spherics signals that have been analyzed with an aid of prescribed appraisal criteria.

* * * * *